(12) United States Patent
Honda (10) Patent No.: US 8,837,004 B2
(45) Date of Patent: Sep. 16, 2014

(54) COMPUTER PROGRAM PRODUCT, PRINT PROCESSING METHOD, AND PRINTING SYSTEM

(71) Applicant: Tadashi Honda, Kanagawa (JP)

(72) Inventor: Tadashi Honda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 74 days.

(21) Appl. No.: 13/728,165

(22) Filed: Dec. 27, 2012

(65) Prior Publication Data

US 2013/0176601 A1 Jul. 11, 2013

(30) Foreign Application Priority Data

Jan. 6, 2012 (JP) .................................. 2012-001597

(51) Int. Cl.
*H04N 1/40* (2006.01)
*G06T 1/00* (2006.01)
*H04N 1/32* (2006.01)

(52) U.S. Cl.
CPC .......... *H04N 1/32149* (2013.01); *G06T 1/0021* (2013.01); *H04N 1/32288* (2013.01)
USPC ........................................ 358/3.28; 382/100

(58) Field of Classification Search
USPC ................... 382/100, 232; 380/210, 287, 54; 713/176; 480/460; 386/94; 399/366; 283/902; 358/1.14, 3.28; 726/26, 31
See application file for complete search history.

(56) References Cited

U.S. PATENT DOCUMENTS

| | | | |
|---|---|---|---|
| 7,505,179 B2 * | 3/2009 | Matsunoshita et al. | ...... 358/3.28 |
| 2007/0041608 A1 | 2/2007 | Maeno | |
| 2008/0192291 A1 | 8/2008 | Honda et al. | |
| 2008/0198394 A1 | 8/2008 | Hamada et al. | |
| 2008/0198405 A1 | 8/2008 | Honda et al. | |
| 2008/0198423 A1 | 8/2008 | Ando et al. | |
| 2008/0225334 A1 | 9/2008 | Hamada et al. | |
| 2009/0109484 A1 | 4/2009 | Honda | |
| 2009/0174910 A1 | 7/2009 | Kuraki et al. | |
| 2012/0236344 A1 | 9/2012 | Nagase et al. | |

FOREIGN PATENT DOCUMENTS

| | | |
|---|---|---|
| JP | 2008-236076 | 10/2008 |
| JP | 4337819 | 7/2009 |
| JP | 4595014 | 9/2010 |
| WO | WO2004/107734 A1 | 12/2004 |
| WO | WO2008/035401 A1 | 3/2008 |

* cited by examiner

*Primary Examiner* — Barbara Reinier
(74) *Attorney, Agent, or Firm* — Harness, Dickey & Pierce, P.L.C.

(57) ABSTRACT

A computer program product includes a non-transitory computer-usable medium having computer-readable program codes embodied in the medium. The program codes when executed cause a computer to function as: an instruction module that instructs each of a plurality of printer drivers to generate an image pattern to be embedded in print image data; an acquisition module that acquires the plurality of image patterns generated by the printer drivers; an embedding module that embeds the acquired plurality of image patterns in the print image data; and a print instruction module that transmits the print image data in which the plurality of image patterns are embedded, to an image forming apparatus.

19 Claims, 8 Drawing Sheets

FIG.7

COMPUTER PROGRAM PRODUCT, PRINT PROCESSING METHOD, AND PRINTING SYSTEM

CROSS-REFERENCE TO RELATED APPLICATIONS

The present application claims priority to and incorporates by reference the entire contents of Japanese Patent Application No. 2012-001597 filed in Japan on Jan. 6, 2012.

BACKGROUND OF THE INVENTION

1. Field of the Invention

The present invention relates to a computer program product, a print processing method, and a printing system making it possible to print a detection image pattern when copying.

2. Description of the Related Art

A technology that adds a digital watermark, a background pattern, or the like to a printout printed on paper or other medium and performs predetermined processing when the digital watermark or the like is detected has conventionally been known. This technology is used for, for example, copy guard to restrict reproduction of a printout. The digital watermark or the background pattern is printed as follows: a background image pattern is generated by an algorithm of a printer driver installed on a user terminal; this image pattern is printed on an entire surface of a sheet as a background pattern. When operation to copy this surface with the background pattern is made on a copier having a function of detecting the copy guard pattern, the copier does not allow operation to perform normal copying by outputting a blank sheet or a printout entire image area of which is filled with a specific color tone. Such detection of a digital watermark is also used to detect falsification or to allow viewing a print history record.

A known example of this type of technology is disclosed in Japanese Patent Application Laid-open No. 2008-236076.

However, a scheme of generating a background pattern and detecting the background pattern varies from one apparatus to another, and a problem occurs particularly in such an environment where image forming apparatuses of a plurality of vendors are used. More specifically, when an attempt to copy a printout of an image pattern generated using an algorithm for an image forming apparatus of a vendor A, using a copier of a vendor B is made, the copier of the vendor B cannot detect the image pattern generated using the algorithm of the vendor A. This leads to a problem that a perfect reproduction of the printout can be made.

There is a need to provide a program that, even in an environment where apparatuses of a plurality of vendors are used, makes it possible to print a detection image pattern detectable by the respective apparatuses, when copying.

SUMMARY OF THE INVENTION

It is an object of the present invention to at least partially solve the problems in the conventional technology.

A computer program product includes a non-transitory computer-usable medium having computer-readable program codes embodied in the medium. The program codes when executed cause a computer to function as: an instruction module that instructs each of a plurality of printer drivers to generate an image pattern to be embedded in print image data; an acquisition module that acquires the plurality of image patterns generated by the printer drivers; an embedding module that embeds the acquired plurality of image patterns in the print image data; and a print instruction module that transmits the print image data in which the plurality of image patterns are embedded, to an image forming apparatus.

A printing system includes: a computer; a computer program product comprising a non-transitory computer-usable medium having computer-readable program codes embodied in the medium; and an image forming apparatus. The program codes when executed cause the computer to function as: an instruction module that instructs each of a plurality of printer drivers to generate an image pattern to detect predetermined information; an acquisition module that acquires the image patterns generated by the printer drivers; an embedding module that embeds the acquired image patterns in print image data; and a print instruction module that transmits the print image data containing the image patterns to the image forming apparatus. The image forming apparatus includes an image forming unit that forms an image based on the print image data transmitted to the image forming apparatus.

A print processing method includes: instructing each of a plurality of printer drivers to generate an image pattern to detect predetermined information; acquiring the image patterns generated by the printer drivers; embedding the acquired image patterns in print image data; and instructing printing by transmitting the print image data containing the image patterns to an image forming apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of programs of the present invention are described in detail below with reference to the accompanying drawings.

First Embodiment

In a first embodiment of the present invention, an example in which a detection image pattern is used to detect unauthorized copying is described.

Figure 1:
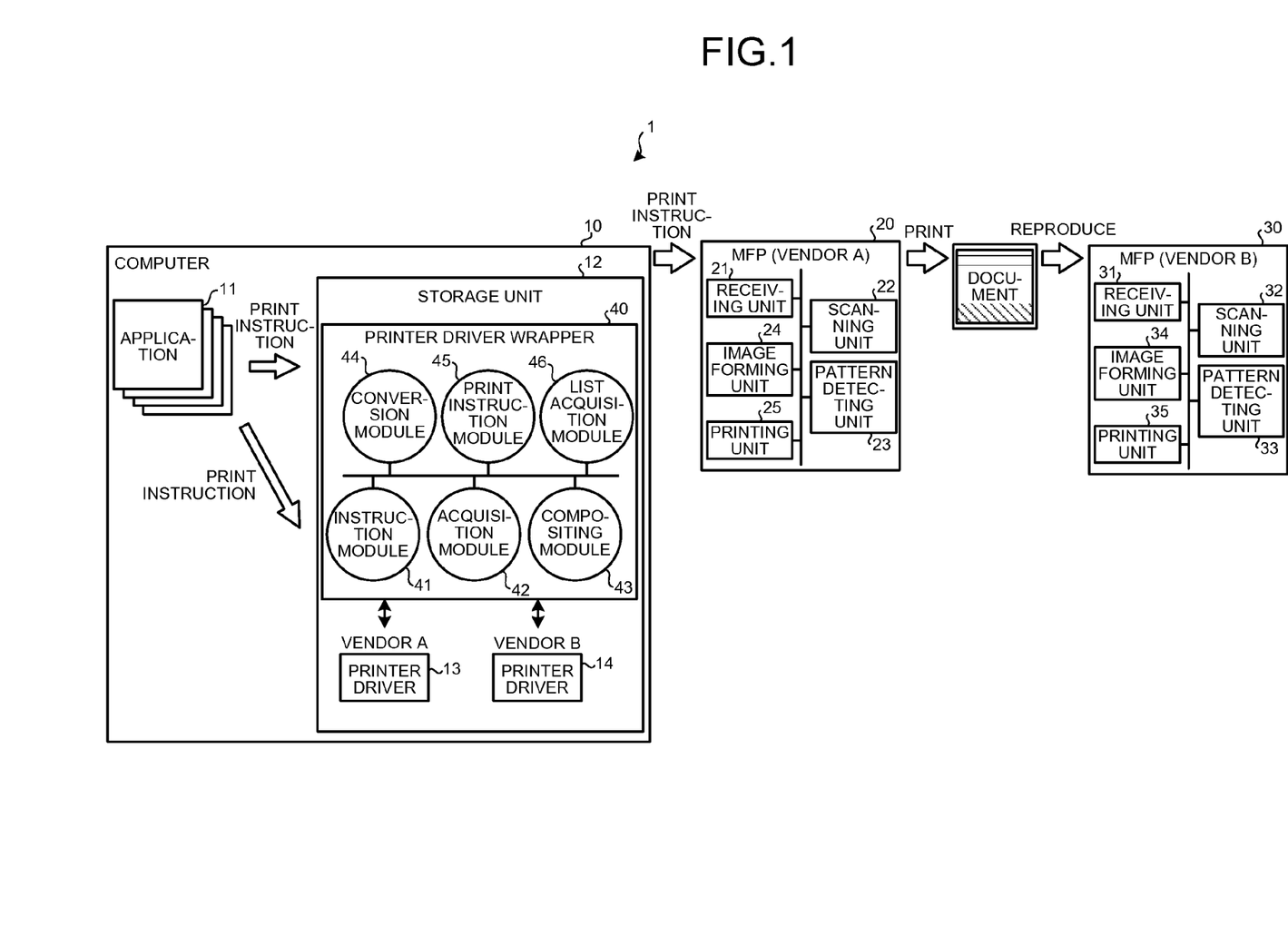
FIG. 1 is a block diagram illustrating a configuration of a printing system according to a first embodiment of the present invention.

FIG. 1 is a block diagram illustrating a configuration of a printing system including an information processing apparatus (computer) on which a program according to the first embodiment is installed. As illustrated in FIG. 1, a printing system 1 according to the first embodiment includes a computer 10 which is the information processing apparatus and multifunction peripherals (MFPs) 20 and 30 which are image forming apparatuses.

The MFP 20 includes a receiving unit 21 which is an interface to which a print instruction is to be input, a scanning unit 22 that scans a document when copying, a pattern detecting unit 23 that detects an image pattern to prevent unauthorized copying from the scanned document, an image forming unit 24 that generates an image to be printed, and a printing unit 25 that performs printing on a recording medium.

Similarly, the MFP 30 includes a receiving unit 31 which is an interface to which a print instruction is to be input, a scanning unit 32 that scans a document when copying, a pattern detecting unit 33 that detects an image pattern to prevent unauthorized copying from the scanned document, an image forming unit 34 that generates an image to be printed, and a printing unit 35 that performs printing on a storage medium.

Multiple types of applications 11, for example, are installed on the computer 10. Example types of the applications 11 include a web browser to access contents written in HTML, a document processing program, a computation program, and an image editing program. Each of these programs has a function of issuing an instruction to perform printing in coordination with a printer driver, which will be described later.

The computer 10 includes a storage unit 12 which is a hard disk drive. The storage unit 12 stores therein, as programs for printing, a printer driver 13 associated with the MFP 20 of the vendor A and a printer driver 14 associated with the MFP 30 of the vendor B. Each of the printer drivers 13 and 14 has not only a function of setting a print condition and a function of converting print data into a file in a format (e.g., Printing Job Language (PJL)) of instruction data for the corresponding MFP, but also a function of generating an image pattern to prevent unauthorized copying. The generated image pattern is transmitted as instruction data to the MFP 20, 30. The MFP 20, 30 outputs (prints) this image pattern as a background pattern on a sheet of paper as a recording medium. When a user attempts to reproduce (copy) this document, on which this image pattern is printed, using the MFP 20, 30, the pattern detecting unit 23, 33 of the MFP 20, detects this image pattern and prevents the copying.

However, algorithms with which the printer drivers 13 and 14 generate the respective image patterns to detect unauthorized copying differ from each other. Accordingly, in a case where, for example, a document output from the MFP 20 is scanned by the MFP 30, the pattern detecting unit 33 is incapable of recognizing the image pattern to detect unauthorized copying, causing a problem that the document is undesirably successfully copied.

To solve this problem, the computer 10 includes a printer driver wrapper 40 associated with these printer drivers 13 and 14 in the storage unit 12.

Even when the algorithms with which the printer drivers 13 and 14 generate respective image patterns to detect unauthorized copying differ from each other, the printer driver wrapper 40 can generate an image pattern adapted to both the algorithms. The printer driver wrapper 40 acquires the image patterns to detect unauthorized copying generated with the algorithms of the printer drivers 13 and 14 and combines the image patterns, thereby generating a composite image pattern that is detectable by both of the MFPs 20 and 30.

Figure 2:
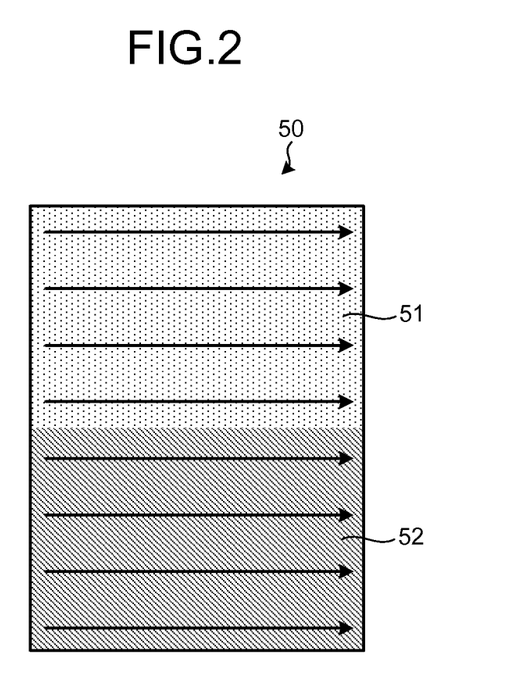
FIG. 2 is a schematic diagram illustrating an example of watermark data according to the first embodiment.

FIG. 2 is a schematic diagram illustrating an example of a composite image pattern 50 generated by the printer driver wrapper 40. Referring to FIG. 2, an image pattern 51 of dots to detect unauthorized copying generated by the printer driver 13 is printed as a background pattern on an upper half of the document, while an image pattern 52 of diagonal lines to detect unauthorized copying generated by the printer driver 14 is printed as a background pattern on a lower half. The image pattern 51 and the image pattern 52 are printed so as not to overlap each other at a boundary area therebetween. When each of the MFPs 20 and 30 scans this composite image pattern 50, scanning is performed in an order that starts from a scanning line indicated by a topmost arrow in FIG. 2 and ends in a scanning line indicated by a bottommost arrow. The image pattern 51 is scanned immediately after start of the scanning. The image pattern 52 is scanned when a scan position reaches a portion where transition from the image pattern 51 to the image pattern 52 occurs. Thus, when an attempt of copying a document on which the composite image pattern 50 is printed, using the MFP 20 is made, the copying is prevented because the image pattern 51 adapted to the MFP 20 is detected. Also when an attempt of copying the document using the MFP 30 is made, the copying prevented because the image pattern 52 adapted to the MFP 30 is detected.

Figure 3:
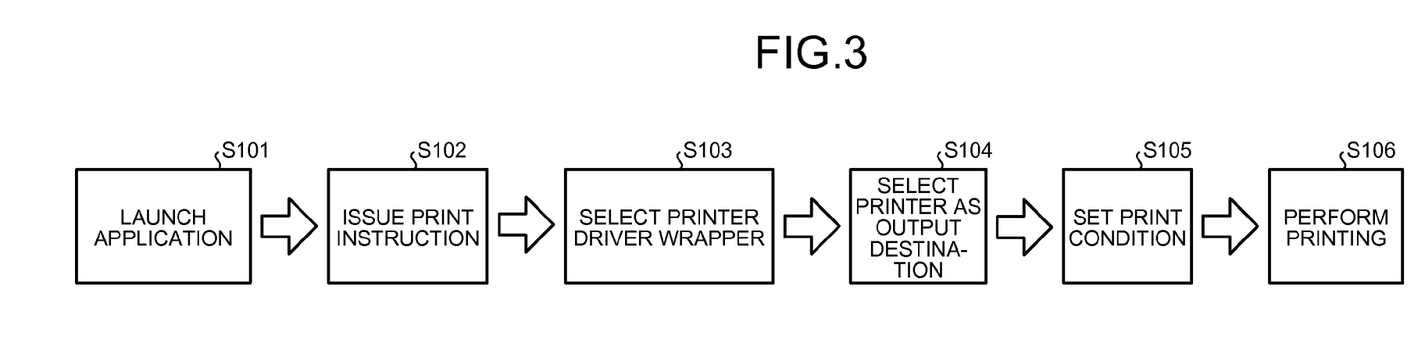
FIG. 3 is a flow diagram illustrating a sequence of operations performed by a user to use a printer driver wrapper according to the first embodiment.

FIG. 3 is a flow diagram illustrating a sequence of operations to be performed by a user to use the printer driver wrapper 40. As illustrated in FIG. 3, the user launches the application 11 to be used first (Step S101). Thereafter, the user selects a navigation element to issue a print instruction from an operation screen of the application 11 (Step S102). Here, the user selects printing by utilizing the printer driver wrapper 40 first (Step S103). Subsequently, the user selects a MFP from which a printout produced by actual printing is to be output (Step S104). When the MFP has been selected, an operation screen to set a print condition provided by the printer driver of the MFP is displayed and the user sets the print condition (Step S105). Finally, the user instructs execution of printing (Step S106).

An example configuration of the printer driver wrapper 40 that provides the functions described above is described below. The printer driver wrapper 40 includes an instruction module 41, an acquisition module 42, a compositing module 43, a conversion module 44, a print instruction module 45, and a list acquisition module 46.

The instruction module 41 issues an instruction to generate an image pattern to each of the printer drivers 13 and 14 with which the printer driver wrapper 40 is associated. Furthermore, the instruction module 41 issues, to the printer driver associated with the MFP selected as the output destination at Step S104, an instruction to generate a file containing not only the image pattern but also the print condition and print data in a format of instruction data for the MFP. Upon receiving the instructions, the printer drivers 13 and 14 to which the respective instructions are issued output respective files to each output the image pattern to detect unauthorized copying, the print condition, and the print data in the format of instruction data and transmit the respective files to the printer driver wrapper 40.

Figure 4A:
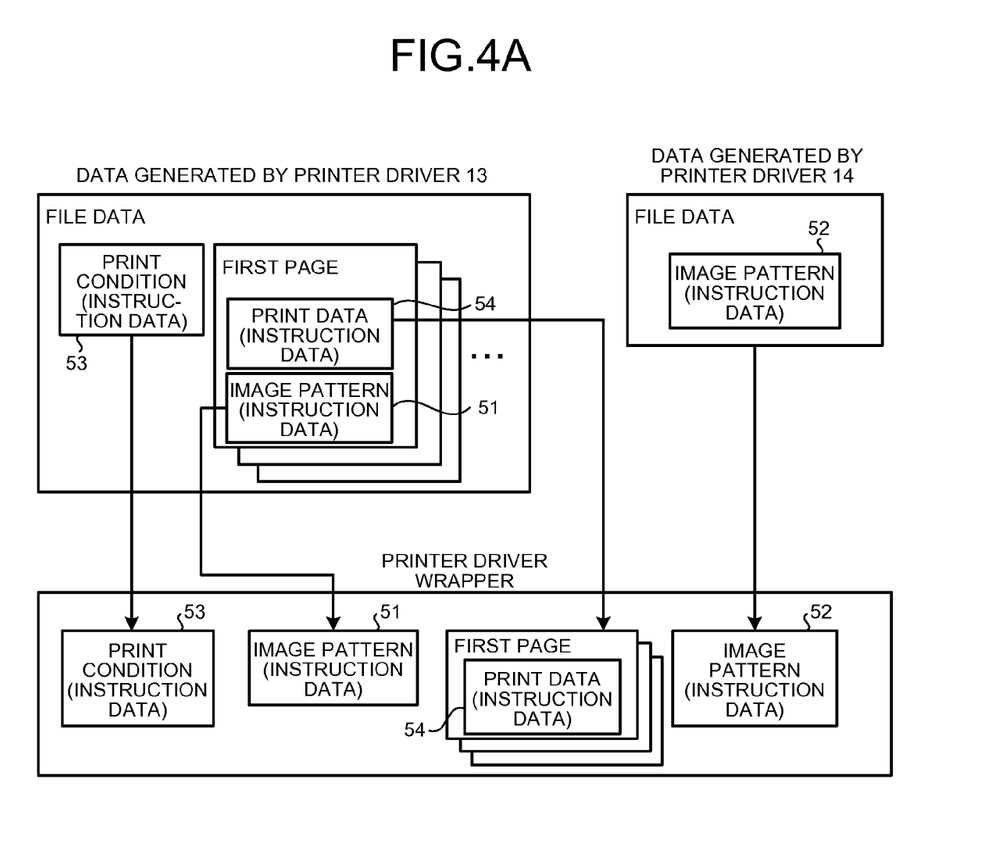
FIG. 4A is a schematic diagram illustrating a structure of print data in which a watermark data according to the first embodiment is embedded.
Figure 4B:
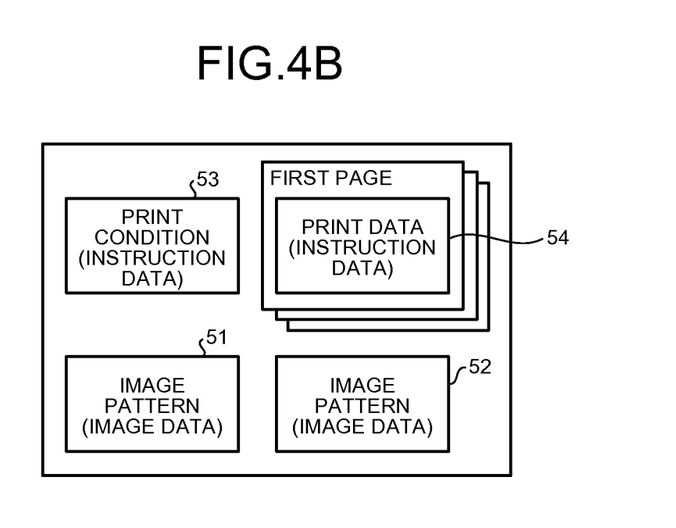
FIG. 4B is a schematic diagram illustrating the structure of the print data in which the watermark data according to the first embodiment is embedded.

FIGS. 4A to 4C are schematic diagrams conceptually illustrating operations of the printer driver wrapper 40. As illustrated in FIG. 4A, the acquisition module 42 reads the file data output from the printer drivers 13 and 14 to acquire the respective image patterns 51 and 52. The image patterns 51 and 52 at this stage are in the format of instruction data. Furthermore, the acquisition module 42 acquires a print condition 53 and print data 54 generated by the printer driver 13. The print condition 53 and the print data 54 are also in the format of instruction data. As illustrated in FIG. 4B, subsequently, the acquisition module 42 converts the image patterns 51 and 52 from the format of instruction data to a format of image data.

Figure 4C:
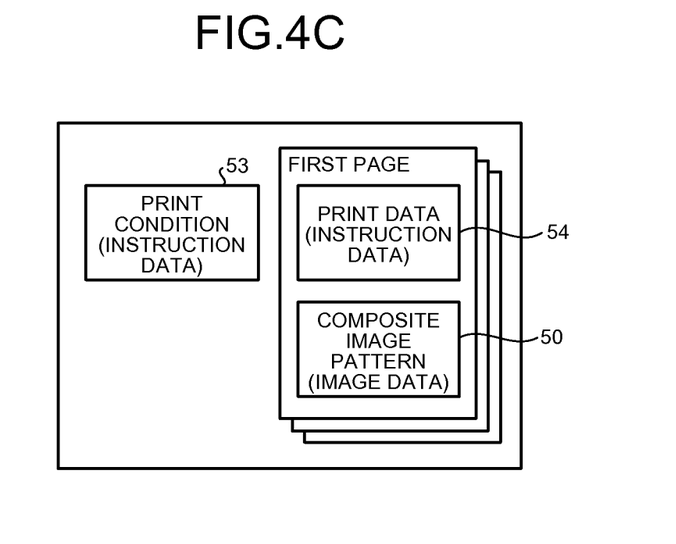
FIG. 4C is a schematic diagram illustrating the structure of the print data in which the watermark data according to the first embodiment is embedded.

As illustrated in FIG. 4C, the compositing module 43 newly generates the composite image pattern 50 by extracting feature elements from the respective image patterns 51 and 52 in the format of image data acquired by the acquisition module 42 and combining the extracted feature elements. Each of the image patterns 51 and 52 to detect unauthorized copying is formed by repeating a specific pattern generated by a corresponding one of the algorithms of the printer drivers 13 and 14. An area containing at least one unit of the repeated specific pattern corresponds to the feature element. In other words, the feature element means a pattern having a region detectable by a corresponding one of the pattern detecting units 23 and 33 of the respective MFPs 20 and 30. The size of the feature element depends on scanning characteristics of a corresponding one of the MFPs 20 and 30 and is desirably 10 pixels by 10 pixels or greater, for example.

The conversion module 44 converts the composite image pattern 50, newly generated by combining by the compositing module 43, into the respective formats of instruction data for the MFPs 20 and 30, and associates the converted data with the print data, thereby generating data for one page to be printed. It is instructed to print the converted composite image pattern 50 as a background pattern on a recording medium when outputting.

The print instruction module 45 transmits the data of all the pages on a page by page basis generated by the conversion module 44 to the MFP 20 or 30 and issues an instruction to perform printing to the MFP 20 or the MFP 30. Furthermore, the print instruction module 45 also outputs the print condition 53 to the MFP 20 or the MFP 30.

The list acquisition module 46 acquires a list of printer drivers to which the printer driver wrapper 40 can issue an output instruction, or, put another way, the list of the printer drivers from each of which the printer driver wrapper 40 can acquire an image pattern to prevent unauthorized copying, and stores the list in the storage unit 12. In terms of actual operation, the list acquisition module 46 acquires the list of the printer drivers stored in the computer 10. Accordingly, when a printer driver is newly installed onto the computer 10, the list acquisition module 46 can automatically acquire this. Meanwhile, the list acquisition module 46 is not necessarily installed on the printer driver wrapper 40. For example, a configuration in which a user manually selects a printer driver in a property screen of the printer driver wrapper 40, or a configuration in which information about printer drivers to which the printer driver wrapper 40 is adaptable is stored in advance can be employed.

By providing the printer driver wrapper 40 configured as described above, the data that includes, as a background pattern, the composite image pattern 50 to prevent unauthorized copying that contains the image patterns generated by the printer drivers 13 and 14 is transmitted to the MFP 20, which in turn outputs a document. Even when this document is scanned by the MFPs 20 and 30, the image patterns to prevent unauthorized copying in both the MFPs 20 and 30 are detected. Accordingly, reproduction of the document can be successfully prevented.

Figure 5:
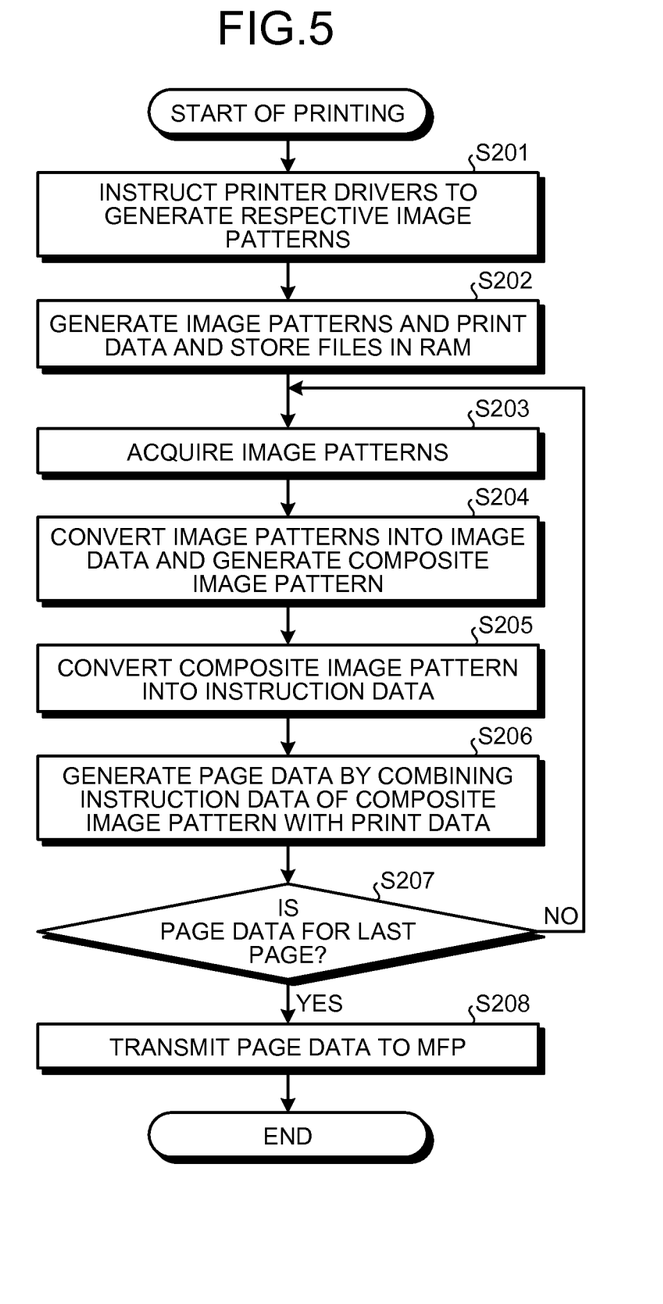
FIG. 5 is a flow diagram illustrating an operation sequence of embedding the watermark data according to the first embodiment.

A sequence of operations of this print processing performed using the printer driver wrapper 40 is described with reference to FIG. 5. The print processing illustrated in FIG. 5 starts when a user causes the application 11 of the computer 10 to perform printing.

The printer driver wrapper 40 transmits instructions to generate the respective image patterns 51 and 52 to prevent unauthorized copying to the respective printer drivers 13 and 14 (Step S201). The printer driver wrapper 40 also issues an instruction to generate instruction data of the print condition 53 and the print data 54 on a page by page basis to the printer driver associated with the MFP to which a print instruction is issued. On receiving the instructions, the printer drivers 13 and 14 to which the respective instructions are issued generate the respective image patterns 51 and 52, the print condition 53, and the print data 54, and temporarily store them as files in a random access memory (RAM) of the computer 10 (Step S202). As described above, each of the files is of the format of instruction data that is readable by the corresponding image forming apparatus.

The printer driver wrapper 40 acquires the image patterns 51 and 52 generated by the printer drivers 13 and 14, respectively, from the files stored in the RAM (Step S203). The printer driver wrapper 40 converts the acquired image patterns 51 and 52 from the format of instruction data to the format of image data, and generates the composite image pattern 50 by extracting a feature element from each of the image patterns 51 and 52 (Step S204).

Subsequently, the printer driver wrapper 40 converts the composite image pattern 50 into the format of instruction data for the image forming apparatus (Step S205), and incorporates this as background data of the print data, thereby generating page data for one page (Step S206). The printer driver wrapper 40 determines whether this is for the last page (Step S207). When the page data is not for the last page (No at Step S207), the process is repeated from Step S203 until page data for the last page is generated. When the printer driver wrapper 40 determines that the page data is for the last page (Yes at Step S207), the printer driver wrapper 40 transmits the instruction data to one of the MFP 20 and the MFP 30 selected as the output destination (Step S208), and the process ends.

The program according to the embodiment described above makes it possible to newly generate the composite image pattern 50 by acquiring the image patterns 51 and 52 to prevent unauthorized copying from the plurality of printer drivers 13 and 14 and extracting the feature elements with which unauthorized copying is detectable from the image patterns 51 and 52. Irrespective of which one of the associated MFPs is used in an attempt of reproducing a document on which the composite image pattern 50 is printed as the background, reproduction can be successfully prevented because the pattern detecting unit 23 or 33 detects the image pattern. Accordingly, it is possible to cause the copy guard to function appropriately even in an environment where apparatuses of a plurality of vendors are used.

In the embodiment, an example where the two printer drivers are used has been described. However, the embodiment is applicable to an environment where drivers of three or more different vendors are used. In that case, three or more different image patterns are combined to generate the composite image pattern 50.

Modifications

Figure 6:
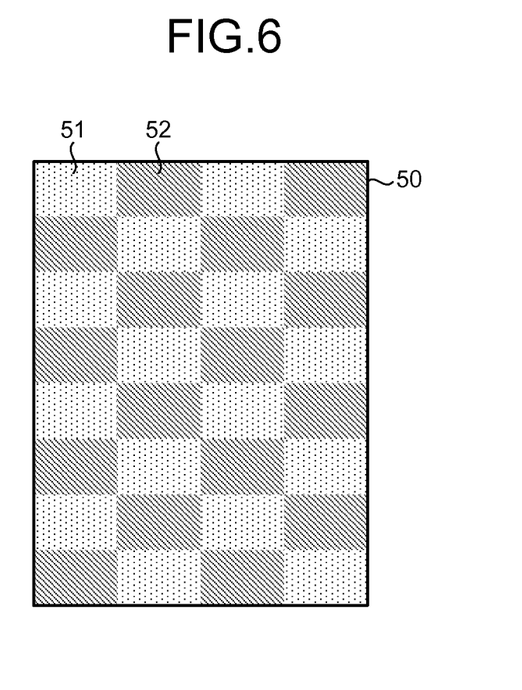
FIG. 6 is a schematic diagram illustrating a modification of the watermark data according to the first embodiment.
Figure 7:
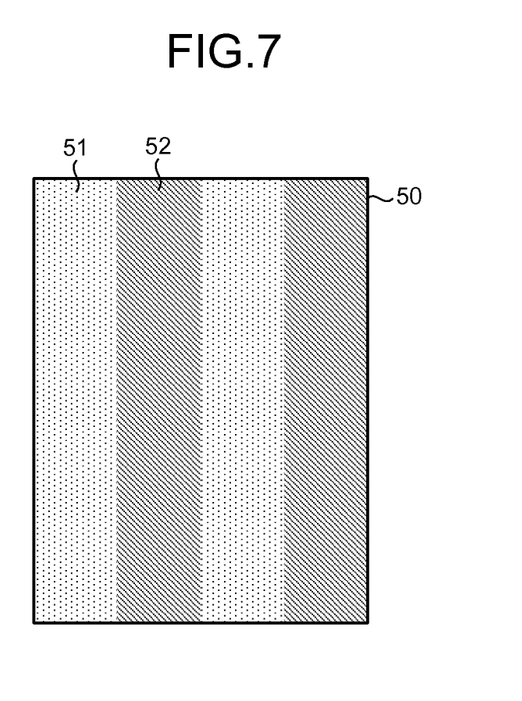
FIG. 7 is a schematic diagram illustrating another modification of the watermark data according to the first embodiment.

As a modification of the composite image pattern 50 generated by the printer driver wrapper 40, a pattern illustrated in FIG. 6 or a pattern illustrated in FIG. 7 can be used. FIG. 6 illustrates an example in which the image pattern 51 and the image pattern 52 are arranged in a chequered pattern. FIG. 7 illustrates an example in which the image pattern 51 and the image pattern 52 are arranged in alternating stripes in a horizontal direction of FIG. 7. When the image patterns are arranged as in the modifications and assuming a sheet is scanned horizontally in FIG. 6 or 7, both of the image pattern 51 and the image pattern 52 are detected at an early stage of the scanning. In contrast, in the case of the composite image pattern 50 illustrated in FIG. 2, although the image pattern 51 is detected at the early stage, it takes a long time until the image pattern 52 is detected. Accordingly, a situation that reproduction is stopped after the reproduction is undesirably made to a certain extent can occur.

Therefore, such an arrangement as in FIG. 6 or FIG. 7 where the image pattern 51 and the image pattern 52 are arranged in at least one of the main-scanning direction and the sub-scanning direction is more suitable when detecting unauthorized copying at an early stage is aimed. However, when the composite image pattern has such an arrangement, the composite image pattern becomes undesirably conspicuous as a background on a sheet, causing a problem that the sheet is visually degraded.

Therefore, a configuration in which a user can select a type of the image pattern on an operation screen of the printer driver wrapper 40 can be employed. For example, a configuration in which a user can select either an "appearance-priority mode" in which a composite image pattern that is less conspicuous as a background as is the composite image pattern illustrated in FIG. 2 is used or a "function-priority mode" in which a composite image pattern that can reduce time necessary to detect unauthorized copying as does the composite image pattern illustrated in FIG. 6 or 7 is used as a background can be employed.

Second Embodiment

A configuration of a printing system according to a second embodiment of the present invention is described with reference to FIG. 8. In the second embodiment, the printer driver wrapper 40, and the printer drivers 13 and 14 are arranged in a print server 60 rather than in the computer 10. Same constituents as those of the first embodiment are denoted by the same reference numerals.

Figure 8:
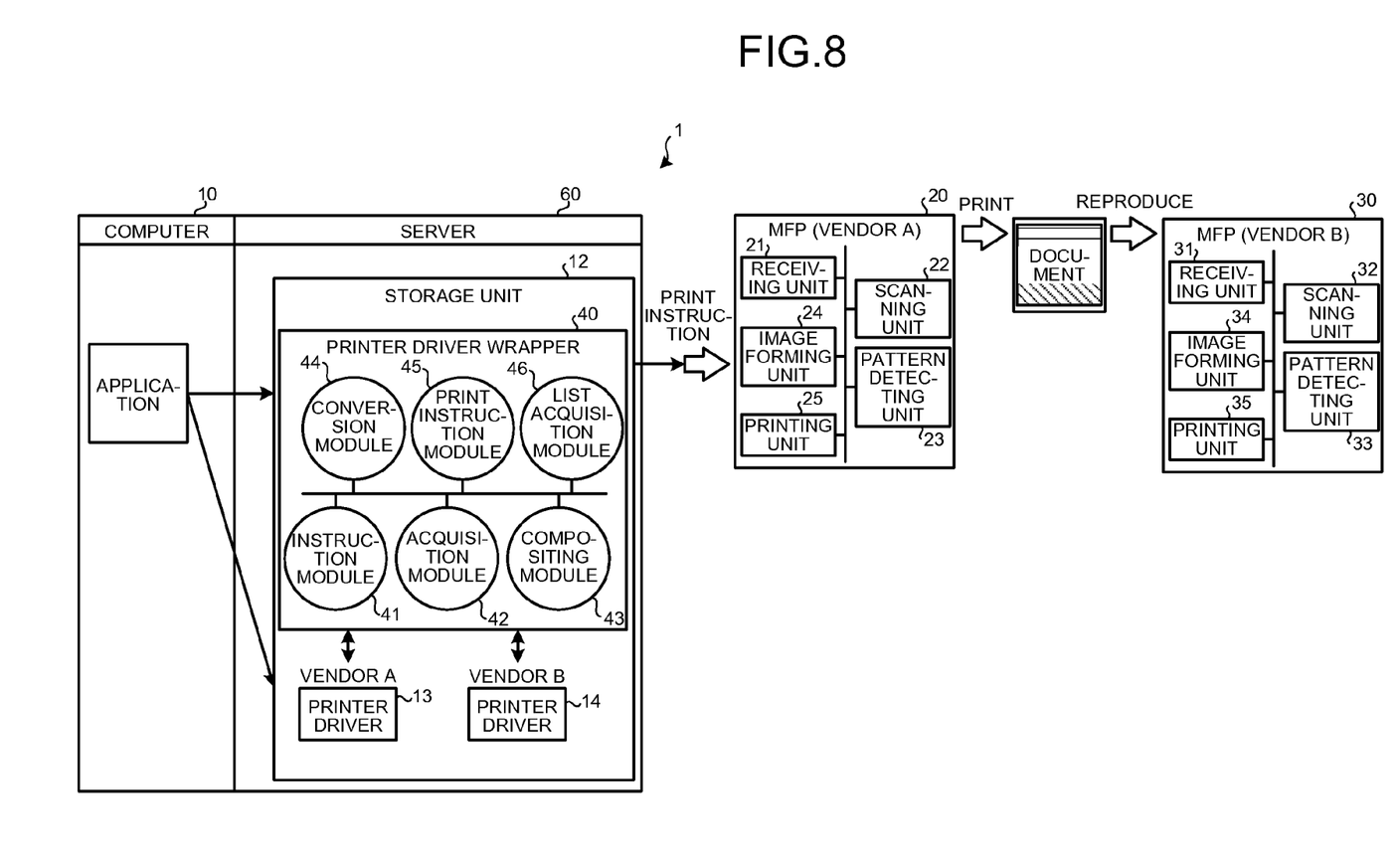
FIG. 8 is a block diagram illustrating a configuration of a printing system according to a second embodiment of the present invention.

The printing system configured as illustrated in FIG. 8 operates in a manner similar to that of the first embodiment except that a print instruction from an application in the computer 10 is transmitted to the printer driver wrapper 40 in the print server 60.

Each of the programs of the first and second embodiments is applicable to the configuration modified as described below.

For example, in the program according to the embodiments, the composite image pattern generated by extracting feature elements from the image patterns generated by the printer drivers is embedded in the print image data. Alternatively, the image patterns may be individually embedded in the print image data without performing the compositing.

It is not necessarily required to print the image pattern as a background in the print image data. The image pattern is detectable so long as the image pattern is contained in a part of a sheet that is scanned when copying.

The image pattern can be used in other use than in detection of unauthorized copying. For example, the configuration according to the embodiments is applicable to a falsification-detection image pattern for use in detecting falsification of contents of or a numeral in a document when copying. In this case, it is possible to cause the following process to be performed: when an image pattern is detected, comparing a feature value of print image data stored in association with the image pattern, with a feature value of an actually scanned image, thereby determining whether the different exists; furthermore, when the difference exists, causing a printed surface to be painted with red.

The program can be configured as follows: each time the image pattern is detected, data about copying (user information, information about time when the copying is made, and the like) is stored in an image forming apparatus, and all stored history data is output to a panel or the like of the image forming apparatus. The program can also be used in security trace that is carried out by storing information about a user who has instructed printing, information about time when the printing is performed, and the like in association with the image pattern, and outputting this user information and the like to a panel or the like when copying.

The program can be provided as being installed in a read only memory (ROM) or the like in advance. The program can be provided as a computer program product by being recorded in a computer-readable recording medium such as a compact disc-read-only memory (CD-ROM), a flexible disk (FD), a compact disc recordable (CD-R), or a digital versatile disk (DVD) in an installable or executable format.

Each of the programs according to the first and second embodiments can be stored in a computer connected to a network such as the Internet so that the program is provided by downloading via the network. Each of the programs according to the first and second embodiments can be provided or distributed via a network such as the Internet.

Each of the programs of the first and second embodiments has a module structure made up of the modules described above. From the viewpoint of actual hardware, a central processing unit (CPU) may read out the program from the ROM and execute the program to load the various modules on a main storage device, causing the functions to be generated on the main storage device.

According to an aspect of the present invention, it is possible, even in an environment where apparatuses of a plurality of vendors are used, to print an image pattern for detection adapted to the respective apparatuses when copying.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer program product comprising a non-transitory computer-usable medium having computer-readable program codes embodied in the medium, wherein the program codes when executed cause a computer to function as:
    an instruction module that instructs each of a plurality of printer drivers to generate an image pattern to be embedded in print image data;
    an acquisition module that acquires the plurality of image patterns generated by the printer drivers;

an embedding module that embeds the acquired plurality of image patterns in the print image data; and a print instruction module that transmits the print image data in which the plurality of image patterns are embedded, to an image forming apparatus.

2. The computer program product according to claim 1, wherein the program codes when executed cause the computer to further function as:

a compositing module that generates a composite image pattern by extracting a feature element from each of the image patterns generated by the plurality of printer drivers and combining the extracted plurality of feature elements; and a conversion module that converts the composite image pattern into instruction data to print the composite image pattern as a background in the print image data, and the print instruction module transmits the instruction data together with the print image data to the image forming apparatus.

3. The computer program product according to claim 1, wherein the program codes when executed cause the computer to further function as a list acquisition module that acquires a list of the printer drivers installed on the computer, and the instruction module transmits the instruction to generate an image pattern to the printer drivers in the list acquired by the list acquisition module.

4. The computer program product according to claim 2, wherein the compositing module generates the composite image pattern by combining the extracted feature elements of the image patterns in a manner that avoids overlapping the feature elements each other.

5. The computer program product according to claim 2, wherein the compositing module generates the composite image pattern by combining the plurality of extracted feature elements in a manner that alternately arranges the feature elements in at least one of main-scanning direction and sub-scanning direction.

6. The computer program product according to claim 1, wherein the image pattern is to detect unauthorized copying.

7. The computer program product according to claim 1, wherein the image pattern is to detect falsification.

8. A printing system comprising:

a computer;

a computer program product comprising a non-transitory computer-usable medium having computer-readable program codes embodied in the medium; and an image forming apparatus, wherein the program codes when executed cause the computer to function as:

an instruction module that instructs each of a plurality of printer drivers to generate an image pattern to detect predetermined information;

an acquisition module that acquires the image patterns generated by the printer drivers;

an embedding module that embeds the acquired image patterns in print image data; and a print instruction module that transmits the print image data containing the image patterns to the image forming apparatus, and the image forming apparatus includes an image forming unit that forms an image based on the print image data transmitted to the image forming apparatus.

9. The printing system according to claim 8, wherein the program codes when executed cause the computer to further function as:

a compositing module that generates a composite image pattern by extracting a feature element from each of the image patterns generated by the plurality of printer drivers and combining the extracted plurality of feature elements; and a conversion module that converts the composite image pattern into instruction data to print the composite image pattern as a background in the print image data, and the print instruction module transmits the instruction data together with the print image data to the image forming apparatus.

10. The printing system according to claim 8, wherein the program codes when executed cause the computer to further function as a list acquisition module that acquires a list of the printer drivers installed on the computer, and the instruction module transmits the instruction to generate an image pattern to the printer drivers in the list acquired by the list acquisition module.

11. The printing system according to claim 9, wherein the compositing module generates the composite image pattern by combining the extracted feature elements of the image patterns in a manner that avoids overlapping the feature elements each other.

12. The printing system according to claim 9, wherein the compositing module generates the composite image pattern by combining the plurality of extracted feature elements in a manner that alternately arranges the feature elements in at least one of main-scanning direction and sub-scanning direction.

13. The printing system according to claim 8, wherein the image pattern is to detect unauthorized copying or falsification.

14. A print processing method comprising:

instructing each of a plurality of printer drivers to generate an image pattern to detect predetermined information;

acquiring the image patterns generated by the printer drivers;

embedding the acquired image patterns in print image data; and instructing printing by transmitting the print image data containing the image patterns to an image forming apparatus.

15. The print processing method according to claim 14, further comprising:

generating a composite image pattern by extracting a feature element from each of the image patterns generated by the plurality of printer drivers and combining the extracted plurality of feature elements; and converting the composite image pattern into instruction data to print the composite image pattern as a background in the print image data, and wherein, at the instructing, the instruction data is transmitted together with the print image data to the image forming apparatus.

16. The print processing method according to claim 14, further comprising acquiring a list of the printer drivers installed on the computer, and wherein, at the instructing, the instruction to generate an image pattern is transmitted to the printer drivers in the list acquired by the list acquisition module.

17. The print processing method according to claim 15, wherein, at the generating, the composite image pattern is generated by combining the extracted feature elements of the image patterns in a manner that avoids overlapping the feature elements each other.

18. The print processing method according to claim 15, wherein, at the generating, the composite image pattern is generated by combining the plurality of extracted feature elements in a manner that alternately arranges the feature elements in at least one of main-scanning direction and sub-scanning direction.

19. The print processing method according to claim 14, wherein the image pattern is to detect unauthorized copying or falsification.

* * * * *